United States Patent [19]

Deuring

[11] Patent Number: 4,484,751
[45] Date of Patent: Nov. 27, 1984

[54] CRANKCASE HOUSING COVER WITH SEALING MEANS

[75] Inventor: Hans Deuring, Burscheid, Fed. Rep. of Germany

[73] Assignee: Goetze AG, Burscheid, Fed. Rep. of Germany

[21] Appl. No.: 580,421

[22] Filed: Feb. 13, 1984

[30] Foreign Application Priority Data

Feb. 19, 1983 [DE] Fed. Rep. of Germany ....... 3305765

[51] Int. Cl.$^3$ ................. F16J 15/10; F02B 77/00
[52] U.S. Cl. ................................. 277/12; 277/153; 277/178; 277/182; 277/186; 277/214; 277/207 R; 277/DIG. 4; 123/198 E
[58] Field of Search .............. 277/12, 32, 152, 153, 277/165, 178, 181–184, 186, 214, 215, DIG. 4, 207 R; 123/198 R, 198 E

[56] References Cited

U.S. PATENT DOCUMENTS

| | | | |
|---|---|---|---|
| 2,657,080 | 10/1953 | Johnson et al. | 277/152 X |
| 3,053,542 | 9/1962 | Haas | 277/153 X |
| 3,396,712 | 8/1968 | Sakraida et al. | 123/198 E |
| 3,909,017 | 9/1975 | Engstrom | 277/207 X |
| 4,027,644 | 6/1977 | Timour | 123/198 E |
| 4,101,003 | 7/1978 | Timour et al. | 123/198 E X |
| 4,213,440 | 7/1980 | Abe et al. | 123/198 E X |

FOREIGN PATENT DOCUMENTS

| | | |
|---|---|---|
| 2551360 | 5/1977 | Fed. Rep. of Germany . |
| 2822615 | 12/1979 | Fed. Rep. of Germany . |
| 1421008 | 1/1976 | United Kingdom . |

OTHER PUBLICATIONS

Erich Hoepke, "Motor und Kurbelwelle als Schwingungssystem und ihr Einfluss auf die Kurbelwellen-Dichtungen", Issue 42 of Motortechnische Zeitschrift, Jul./Aug., 1981, pp. 285–290.

Primary Examiner—Robert S. Ward
Attorney, Agent, or Firm—Spencer & Frank

[57] ABSTRACT

A housing cover for closing and sealing an opening of a housing from which a shaft-like member projects, comprises a main body having an aperture through which the shaft-like member is adapted to pass, a first elastomer seal vulcanized to the main body about the aperture for sealingly cooperating with the shaft-like member, a second elastomer seal vulcanized to the main body at a distance from and in a different plane than the first elastomer seal for sealingly cooperating with the housing and elastomer sealing elements connecting the first and second elastomer seals with one another.

14 Claims, 4 Drawing Figures

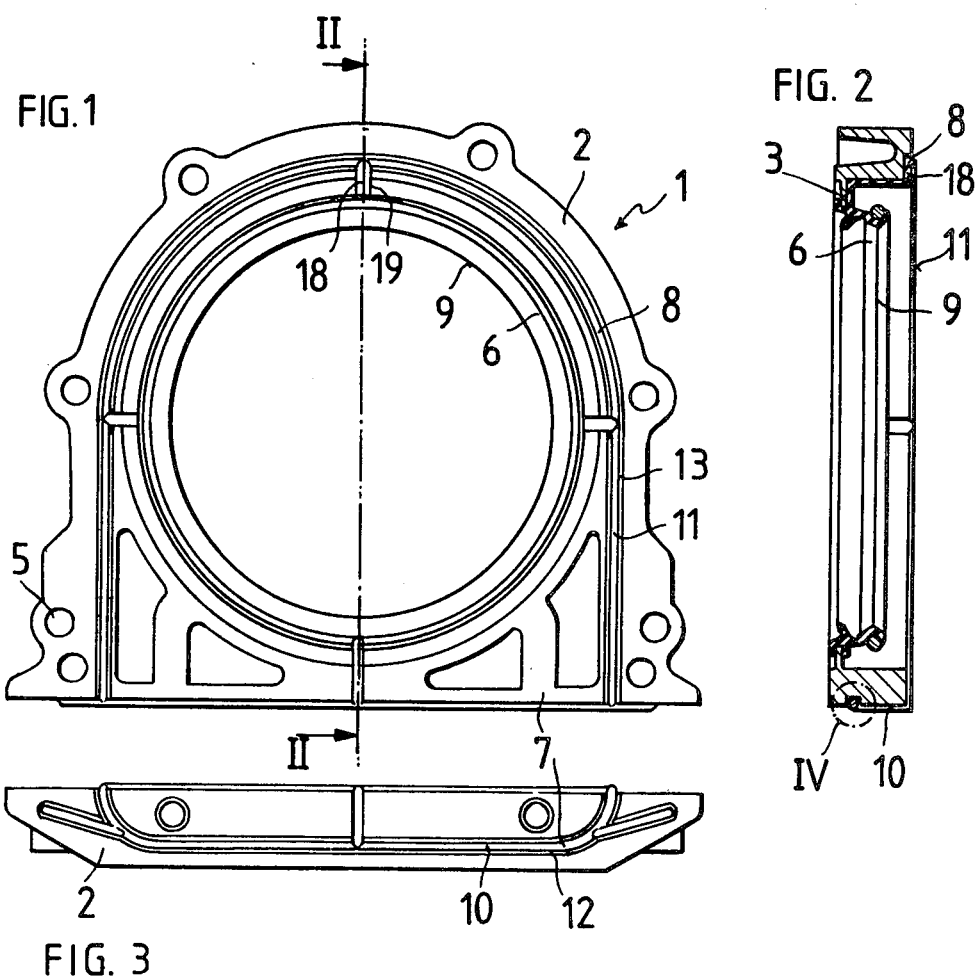

CRANKCASE HOUSING COVER WITH SEALING MEANS

BACKGROUND OF THE INVENTION

This invention relates to a cover, particularly for sealing an opening of a housing from which a shaft or rod projects. The housing cover is of the type which includes a main body of profiled cross section which may have bolt openings and which has a dynamic sealing zone about the central cover aperture through which the shaft or rod passes. The dynamic sealing zone is thus arranged concentrically with respect to the shaft or rod. The main body further has at least one, essentially flat sealing zone lying in a plane other than that in which the dynamic sealing zone is situated. Both sealing zones are provided with sealng elements.

In an article entitled "Motor und Kurbelwelle als Schwingungssystem und ihr Einfluss auf die Kurbelwellen-Dichtungen" ("Engine and Crankshaft as an Oscillating System and their Effect on Crankshaft Seals") in the periodical Motortechnische Zeitschrift (Issue 42 of July/August 1981, pages 285-289) a cover of the above-outlined type is described. The cover has, in the zone of its inner circumferential surface, a dynamic sealing zone formed of a conventional shaft seal ring as well as a static sealing zone which is situated in the outer circumferential surface and which is formed by an O-ring. The cover is mounted on a housing, such as a crankcase, by means of bolts or the like.

The above-outlined conventional sealing cover has several disadvantages. Thus, because individual structural components have to be assembled together, the mounting operation is highly labor-intensive. Further, the sealing components cannot be reliably prevented from slipping out of their intended seat or from undergoing twists which would cause leakages. Since particularly crankcase covers are, for the purpose of saving weight, in most cases made of a light metal and have relatively thin walls, the use of a conventional flat seal in the zone of the end faces of the cover does not fully serve its intended purpose, because the clearance to be sealed between the cover and the housing does not have constant dimensions.

German Offenlegungsschrift (application published without examination) No. 2,822,615 discloses a rod seal for shock absorbers, comprising a dynamic and a static sealing range connected to one another by channels. Both sealing ranges are of circumferential course and serve for seating elastic sealing elements which sealingly engage circumferential faces of a shaft and a shock absorber tube. While in this structure a possibility of connection between the two sealing zones is provided, it cannot find application in covers having sealing zones arranged in different radial and axial planes and further, the channels do not have any sealing function.

SUMMARY OF THE INVENTION

It is an object of the invention to provide an improved cover of the above-outlined type which significantly simplifies assembly and which ensures an optimal seal for all sealing zones.

This object and others to become apparent as the specification progresses, are accomplished by the invention, according to which, briefly stated, the sealing elements for the dynamic and static sealing zones are formed of profiled rubber members vulcanized to the main cover body and the sealing elements are connected to one another by means of additional sealing zones formed of sealing elements.

The invention provides that all sealing elements together constitute a single, unitary structure which significantly simplifies the mounting (assembling) operation. Further, the manufacture of a unitary sealing element structure is simplified because only a single mold is required. Since the covers for such applications are usually manufactured by a die casting process, it is feasible to first die cast the cover and then, in an immediately following process, to apply all sealing elements to the cover in one operational step, for example, by means of a conventional injection molding process.

According to a further feature of the invention, at least the sealing elements forming the static sealing zone or zones, are arranged in grooves provided in the main cover body to make possible a relatively large-volume rubber profile which is adapted to conform to the sealing clearance between the cover and the housing, whereby special stiffening ribs for the cover may be dispensed with.

It is a further advantage of the invention that by means of the additional sealing components connecting the sealing elements, there are provided separated sealing zones which contribute to a reduction of leakage.

The dynamic sealing zone preferably has the configuration of a radial shaft seal and is injected on and vulcanized to a radial projection of the main cover body.

In view of the fact that the requirements are more exacting concerning the dynamic sealing zone than the static sealing zone, according to a further feature of the invention, the two sealing zones are provided with different types of elastomer materials which may have different hardnesses. Thus, the sealing element for the dynamic sealing zone may be a high quality elastomer, for example silicon rubber whereas the sealing elements for the static sealing zone or sealing zones may be made of a low-price elastomer material for example natural rubber to perform a sealing function required in that location. The sealing materials may be applied to the main cover body in a single process step, for example, by means of two injection heads.

According to a further feature of the invention, the bottom of the grooves provided in the main cover body is covered only partially with the elastomer material and the height of the rubber members associated with the static sealing zone or zones is so dimensioned that it projects to a determined extent beyond the edge of the groove. This measure ensures that the elastomer material, upon pressing the cover against the housing, may deform into the remaining flat cross-sectional zone of the groove without pinching or damaging the elastomer material.

According to a preferred embodiment of the invention, the volume of the groove is approximately 30% greater than the volume of the unstressed elastomer material required for the seal.

BRIEF DESCRIPTION OF THE DRAWINGS

FIG. 1 is a front elevational view of a preferred embodiment of the invention.

FIG. 2 is a sectional view taken along line II—II of FIG. 1.

FIG. 3 is a top plan view of the preferred embodiment.

FIG. 4 is an enlarged sectional detail of inset IV of FIG. 2.

DESCRIPTION OF THE PREFERRED EMBODIMENT

Turning to FIGS. 1, 2 and 3, there is illustrated a cover generally designated at 1 for sealing a crankcase (not shown) of an internal combustion engine (also not shown). The cover 1 comprises a die cast main body 2 made of light metal. The cover 1 may be mounted on the crankcase by means of bolts passing through holes 5. The cover 1 has a dynamic sealing zone 6 for sealing the area where the crankshaft passes through the cover and two static sealing zones 7 and 8. All three sealing zones 6, 7 and 8 which lie in different planes, have profiled rubber sealing elements 9, 10 and 11, respectively. The sealing element 9 is a multi-lip radial shaft seal ring which is vulcanized to a radially inwardly extending annular projection 3 of the main body 2. The sealing elements 10 and 11 are rubber members of rectangular profile vulcanized into grooves provided in the main body 2.

Turning now to FIG. 4, there is shown, on an enlarged scale, the groove 12 accommodating the sealing element 10 which is placed with distance to both side walls 14 and 15 in the groove 12 forming hollow spaces 16 and 17. The hollow spaces 16 and 17 take up a significant amount of volume of the deformed (axially compressed) elastomer in the installed state of the cover 1. The sealing element 11 is similarly arranged in the groove 13.

According to the invention, all sealing elements 9, 10 and 11 are connected to one another with profiled rubber members 18 received in grooves 19. The thus formed elastic sealing boundaries ensure a good seal while simplifying manufacture and mounting. For making the seals, the main cover body 2 may be positioned in an injection vulcanizing apparatus where, in one operational step, the elastomer material is applied by injection to the dynamic sealing zone from which the elastomer may flow in the various radial and axial grooves 19 into the static sealing zones 7 and 8.

It will be understood that the above description of the present invention is susceptible to various modifications, changes and adaptations, and the same are intended to be comprehended within the meaning and range of equivalents of the appended claims.

What is claimed is:

1. A housing cover for closing and sealing an opening of a housing from which a shaft-like member projects, comprising
   (a) a main body;
   (b) means for defining, in said main body, an aperture through which the shaft-like member is adapted to pass;
   (c) a first elastomer seal vulcanized to said main body about said aperture for sealingly cooperating with the shaft-like member;
   (d) a second elastomer seal vulcanized to said main body at a distance from, and in a different plane than said first elastomer seal for sealingly cooperating with the housing; and
   (e) elastomer sealing elements connecting said first and second elastomer seals with one another.

2. A housing cover as defined in claim 1, wherein said main body comprises a radially inwardly directed annular projection surrounding said aperture; said first elastomer seal being vulcanized to said annular projection.

3. A housing cover as defined in claim 1, wherein said first and second elastomer seals are of different elastomer materials.

4. A housing cover as defined in claim 1, further comprising means defining grooves in said main body; said elastomer sealing elements being situated in said grooves.

5. A housing cover as defined in claim 4, wherein said grooves extend radially from said first elastomer seal to said second elastomer seal.

6. A housing cover as defined in claim 4, wherein said grooves extend axially from said first elastomer seal to said second elastomer seal.

7. A housing cover as defined in claim 4, wherein said grooves have a rectangular cross-sectional outline.

8. A housing cover as defined in claim 4, wherein each groove has a bottom; said bottom being partially covered by respective said elastomer sealing elements.

9. A housing cover as defined in claim 4, wherein each said groove has a volume approximately 30% greater than that of the respective said elastomer sealing elements in their unstressed state.

10. A housing cover as defined in claim 1, further comprising means defining a groove in said main body; said second elastomer seal being situated in said groove.

11. A housing cover as defined in claim 3, wherein said groove has a rectangular cross-sectional outline.

12. A housing cover as defined in claim 3, wherein said groove has a depth and said second elastomer seal has a height greater than said depth.

13. A housing cover as defined in claim 3, wherein said groove has a volume approximately 30% greater than that of said second elastomer seal in its unstressed state.

14. A housing cover as defined in claim 3, wherein said groove has a bottom; said bottom being partially covered by said second elastomer seal.

* * * * *